(12) United States Patent
Sanz Martinez et al.

(10) Patent No.: US 11,867,077 B2
(45) Date of Patent: Jan. 9, 2024

(54) ACOUSTIC STRUCTURE WITH FLOATING INTERIOR SKIN

(71) Applicant: Rohr, Inc., Chula Vista, CA (US)

(72) Inventors: Pablo T. Sanz Martinez, San Diego, CA (US); Jose S. Alonso-Miralles, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 227 days.

(21) Appl. No.: 17/340,461

(22) Filed: Jun. 7, 2021

(65) Prior Publication Data

US 2022/0389838 A1 Dec. 8, 2022

(51) Int. Cl.
*F01D 25/30* (2006.01)
*F02K 1/34* (2006.01)

(52) U.S. Cl.
CPC ............. *F01D 25/30* (2013.01); *B64D 33/06* (2013.01); *F05D 2220/323* (2013.01); *F05D 2240/126* (2013.01); *F05D 2250/191* (2013.01); *F05D 2250/61* (2013.01); *F05D 2260/963* (2013.01)

(58) Field of Classification Search
None
See application file for complete search history.

(56) References Cited

U.S. PATENT DOCUMENTS

| | | | |
|---|---|---|---|
| 4,240,519 A | 12/1980 | Wynosky | |
| 4,944,362 A | 7/1990 | Motsinger | |
| 9,051,899 B2 | 6/2015 | Malot | |
| 9,062,610 B2 | 6/2015 | Morvant | |
| 9,261,008 B2 * | 2/2016 | Mecuson | F01D 25/30 |
| 9,704,467 B1 * | 7/2017 | Nampy | G10K 11/172 |
| 9,978,354 B2 * | 5/2018 | Nampy | G10K 11/168 |
| 2004/0076512 A1 * | 4/2004 | Lata Perez | F02C 7/24 |
| | | | 415/119 |
| 2011/0108357 A1 | 5/2011 | Vauchel | |
| 2013/0306403 A1 | 11/2013 | Todorovic | |
| 2018/0229829 A1 | 8/2018 | Pierick | |
| 2019/0301370 A1 | 10/2019 | Joshi | |
| 2020/0088135 A1 | 3/2020 | Lopez | |
| 2021/0102513 A1 | 4/2021 | Le Boulicaut | |

OTHER PUBLICATIONS

EP search report for EP22177589.3 dated Oct. 14, 2022.

* cited by examiner

*Primary Examiner* — Kayla Mccaffrey
(74) *Attorney, Agent, or Firm* — Getz Balich LLC

(57) ABSTRACT

A structure is provided that includes a perforated first skin, a second skin and a core. The core includes a first sidewall, a second sidewall, a first baffle and a second baffle. The core forms a plurality of cavities vertically between the perforated first skin and the second skin. The first baffle is connected to the perforated first skin at a first baffle first end. The first baffle is connected to the second skin at a first baffle second end by a first moveable joint. The second baffle is connected to the perforated first skin at a second baffle first end. The second baffle is connected to the second skin at a second baffle second end. A first of the cavities extends laterally between the first sidewall and the second sidewall. The first cavity extends longitudinally between the first baffle and the second baffle.

15 Claims, 15 Drawing Sheets

ACOUSTIC STRUCTURE WITH FLOATING INTERIOR SKIN

BACKGROUND

1. Technical Field

This disclosure relates generally to sound attenuation and, more particularly, to an acoustic structure for passively attenuating sound waves.

2. Background Information

Various noise generating systems such as aircraft propulsion systems include acoustic structures for passively attenuating sound waves. One known type of such an acoustic structure is an acoustic bond panel. Various types and configurations of acoustic bond panels and, more generally, acoustic structures are known in the art. While these known panels/structures have various benefits, there is still room in the art for improvement. There is also room in the art for improvement in acoustic panel/acoustic structure manufacturing and assembly techniques.

SUMMARY OF THE DISCLOSURE

According to an aspect of the present disclosure, a structure is provided that includes a perforated first skin, a second skin and a core. The core includes a first sidewall, a second sidewall, a first baffle and a second baffle. The core forms a plurality of cavities vertically between the perforated first skin and the second skin. The first baffle extends between a first baffle first end and a first baffle second end. The first baffle is connected to the perforated first skin at the first baffle first end. The first baffle is connected to the second skin at the first baffle second end by a first moveable joint. The second baffle extends between a second baffle first end and a second baffle second end. The second baffle is connected to the perforated first skin at the second baffle first end. The second baffle is connected to the second skin at the second baffle second end. The cavities include a first cavity. The first cavity extends laterally between the first sidewall and the second sidewall. The first cavity extends longitudinally between the first baffle and the second baffle.

According to another aspect of the present disclosure, a structure is provided that includes a perforated first skin, a second skin and a core. The core includes a first sidewall, a second sidewall, a first baffle, a second baffle and a first septum. The core forms a plurality of cavities vertically between the perforated first skin and the second skin. The cavities include a first cavity. The first cavity extends vertically between the perforated first skin and the second skin. The first cavity extends laterally between the first sidewall and the second sidewall. The first cavity extends longitudinally between the first baffle and the second baffle. The first septum divides the first cavity into a plurality of fluidly coupled sub-cavities. The first septum extends between a first septum first end and a first septum second end. The first septum is connected to the perforated first skin at the first septum first end. The first septum is connected to the second skin at the first septum second end by a first moveable joint.

According to still another aspect of the present disclosure, a structure is provided that includes a first skin, a second skin and a core. The core extends vertically between and is connected to the first skin and the second skin. The core forms a plurality of sound attenuating cavities vertically between the first skin and the second skin. Each of the sound attenuating cavities is fluidly coupled with one or more respective perforations through the first skin. The second skin is configured to float relative to the core.

The core may include a plurality of baffles. Each of the baffles may be connected to the second skin through a slip joint.

The first baffle may extend between a first baffle first end and a first baffle second end. The first baffle may be connected to the perforated first skin at the first baffle first end. The first baffle may be connected to the second skin at the first baffle second end by a second moveable joint.

The first moveable joint may be configured as or otherwise include a slip joint.

The structure may also include a bracket connected to the second skin. The bracket may include a baffle channel. The first baffle may project into the baffle channel to the first baffle second end. The first baffle may be configured to translate within the baffle channel to form the first moveable joint.

The second skin may include a first panel extending between a first panel first end and a first panel second end. The bracket may also include a panel channel. The first panel may project into the panel channel to the first panel first end. The first panel may be configured to translate within the panel channel. The first panel may be connected to the second baffle at the first panel second end.

The structure may also include a first septum dividing the first cavity into a plurality of fluidly coupled sub-cavities. The first septum may extend between a first septum first end and a first septum second end. The first septum may be connected to the perforated first skin at the first septum first end. The bracket may also include a septum channel. The first septum may project into the septum channel to the first septum second end. The first septum may be configured to translate within the septum channel.

The first septum may be fixedly connected to the perforated first skin at the first septum first end.

The first baffle may be fixedly connected to the perforated first skin at the first baffle first end.

The second baffle may be connected to the second skin at the second baffle second end by a second moveable joint.

The second baffle may be fixedly connected to the perforated first skin at the second baffle first end.

The structure may also include a bracket connected to the second skin. The bracket may include a baffle channel. The second baffle may project into the baffle channel to the second baffle second end. The second baffle may be configured to translate within the baffle channel.

The second skin may include a first panel and a second panel that is connected to the first panel at a second moveable joint. The first baffle may be connected to the first panel at a first end of the first panel by the first moveable joint. The second baffle may be connected to the second panel at a first end of the second panel.

The structure may also include a corrugated ribbon arranged laterally between the first sidewall and the second sidewall. The corrugated ribbon may include the second baffle.

The structure may also include a first septum dividing the first cavity into a plurality of fluidly coupled sub-cavities.

The structure may also include a first septum dividing the first cavity into a plurality of fluidly coupled sub-cavities. The first septum may extend between a first septum first end and a first septum second end. The first septum may be connected to the perforated first skin at the first septum first end. The first septum may be connected to the second skin at the first septum second end.

The structure may also include a plurality of modules arranged circumferentially around a longitudinal centerline in an array. A first of the modules may include a section of the first sidewall, the first baffle and a section of the second skin.

The structure may also include an exhaust center body for a gas turbine engine. The exhaust center body may include the perforated first skin, the second skin and the core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
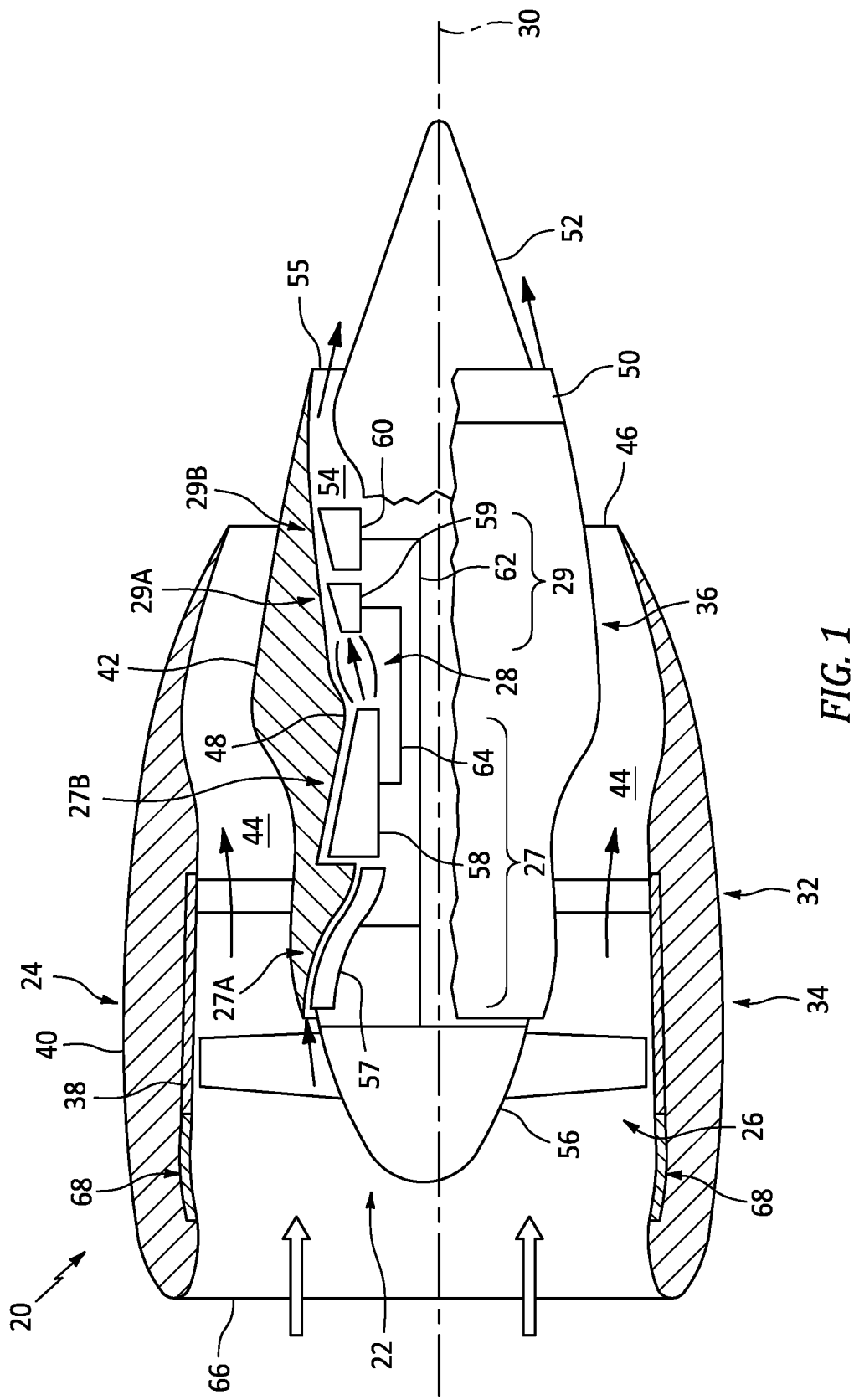
FIG. 1 is a schematic side cutaway illustration of an aircraft propulsion system.

FIG. 1 illustrates a turbine engine system for an aircraft such as, but not limited to, a commercial airliner or cargo plane. This turbine engine system is configured as an aircraft propulsion system 20, and includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29 are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; e.g., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; e.g., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flowpath 44. This bypass flowpath 44 extends axially along the centerline 30 within the aircraft propulsion system 20 to a bypass nozzle outlet 46, where the bypass flowpath 44 is radially between the nacelle structures 40 and 42.

The inner housing structure 36 includes an inner case 48 (e.g., a core case) and the inner nacelle structure 42. The inner case 48 houses one or more of the engine sections 27A-29B, which engine sections 27A-29B may be collectively referred to as an engine core. The inner nacelle structure 42 houses and provides an aerodynamic cover for the inner case 48. A downstream/aft portion of the inner housing structure 36 such as, for example, a core nozzle 50 of the inner nacelle structure 42 also covers at least a portion of an exhaust center body 52. More particularly, the inner nacelle structure 42 and its core nozzle 50 axially overlap and extend circumferentially about (e.g., completely around) the exhaust center body 52. The core nozzle 50 and the exhaust center body 52 thereby collectively form a downstream/aft portion of a core flowpath 54. This core flowpath 54 extends axially within the aircraft propulsion system 20, through the engine sections 27A-29B, to a core nozzle outlet 55 at a downstream/aft end of the aircraft propulsion system 20.

Each of the engine sections 26, 27A, 27B, 29A and 29B of FIG. 1 includes a respective rotor 56-60. Each of these rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The shafts 62 and 64 are rotatably supported by a plurality of bearings (not shown). Each of these bearings is connected to the aircraft propulsion system 20 housing by at least one stationary structure such as, for example, an annular support strut.

During operation, air enters the aircraft propulsion system 20 through an airflow inlet 66. This air is directed through the fan section 26 and into the core flowpath 54 and the bypass flowpath 44. The air within the core flowpath 54 may be referred to as "core air". The air within the bypass flowpath 44 may be referred to as "bypass air".

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flowpath 44. The propulsion of the bypass air may account for a majority of thrust generated by the turbine engine 22. The present disclosure, however, is not limited to the exemplary gas turbine engine configuration described above.

Sound waves (e.g., engine noise) generated during turbine engine operation propagate through the combustion products flowing through the core flowpath 54 and out of the aircraft propulsion system 20. These sound waves, if unmitigated, can be disruptive to people and/or animals within a certain proximity of the aircraft propulsion system 20. The exhaust center body 52 and/or one or more other components of the aircraft propulsion system 20 at (e.g., on, adjacent or proximate) the core nozzle outlet 55 therefore are configured for sound attenuation to reduce (e.g., attenuate) the engine noise propagating from the core nozzle outlet 55. Depending on the specific turbine engine design, the engine noise propagating through the core flowpath 54 may have relatively low frequencies; e.g., between about 250 Hz and 2000 Hz.

Figure 2:
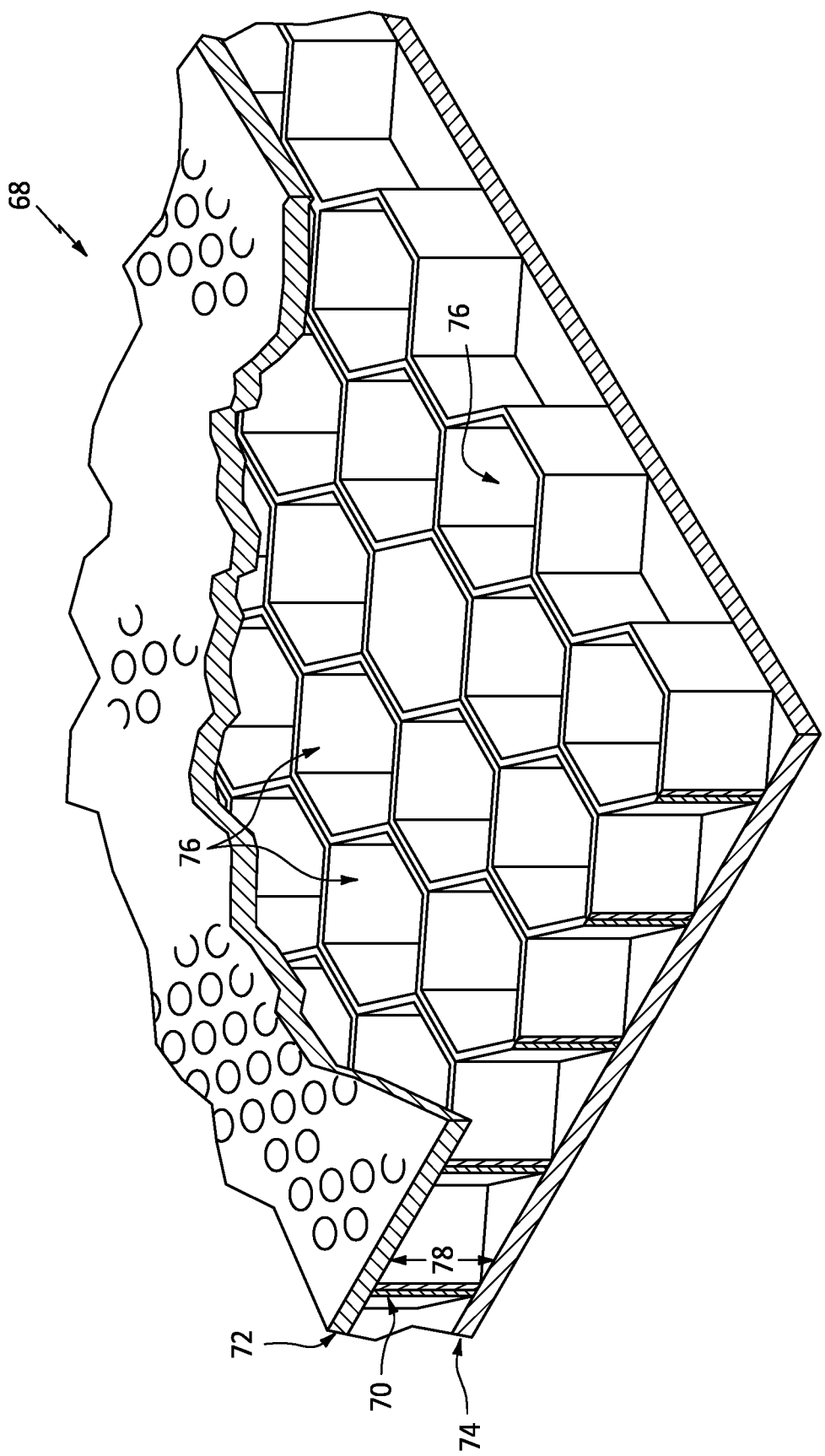
FIG. 2 is a perspective cutaway illustration of a portion of an acoustic bond panel.

Various technologies can be implemented to attenuate sound. An inner barrel of the outer nacelle structure 40, for example, may include one or more acoustic bond panels 68. These acoustic bond panels 68 are arranged circumferentially about the centerline 30 in an annular array. Referring to FIG. 2, each acoustic bond panel 68 may include a cellular core 70 (e.g., a honeycomb core, etc.) sandwiched between and fixedly bonded to a perforated face skin 72 and a non-perforated back skin 74. The cellular core 70 forms a plurality of sound attenuating cavities 76 between the face skin 72 and the back skin 74, which cavities 76 form Helmholtz resonators within the acoustic bond panel 68. The cavities 76 are tuned (e.g., sized) to attenuate sound waves with a particular target frequency (or range of target frequencies). A thickness 78 of the cellular core 70 may be inversely proportional to the target frequency. For example, as the target frequency increases (e.g., the sound waves are relatively high pitch), the cellular core thickness 78 may decrease. However, as the target frequency decreases (e.g., the sound waves are relatively low pitch), the cellular core thickness 78 may increase.

Referring again to FIG. 1, the acoustic bond panels 68 may be well suited for relatively cool and/or thermally stable areas of the aircraft propulsion system 20. Such acoustic bond panels, however, may be difficult to implement in areas of the aircraft propulsion system 20 with more severe operating conditions such as those experienced proximate the core nozzle outlet 55. Components that form and/or are proximate the core flowpath 54 and its core nozzle outlet 55, for example, may routinely be subjected to relatively high operating temperatures, relatively high thermally induced stresses and/or relatively large temperature gradients particularly, for example, during engine startup and/or aircraft takeoff. Such operating conditions may become even more severe as aircraft propulsion system engineers continue to push design limits to further increase engine efficiency and/or engine thrust. A relatively thick acoustic bond panel tuned for attenuating relatively low frequency sound waves at the core nozzle outlet 55 therefore may be subject to relatively severe thermal gradients, radially, axially as well as circumferentially. A perforated face skin of the acoustic bond panel, for example, may be subjected to fluctuating and relatively hot combustion products, whereas a back skin of the acoustic panel may be subject to stable and relatively cool air. This temperature differential may subject the acoustic bond panel to relatively high thermally induced stresses and fatigue, particularly since fixed connections between a cellular core and the face and back skins do not accommodate relative movement between components of the acoustic bond panel.

Figure 3:
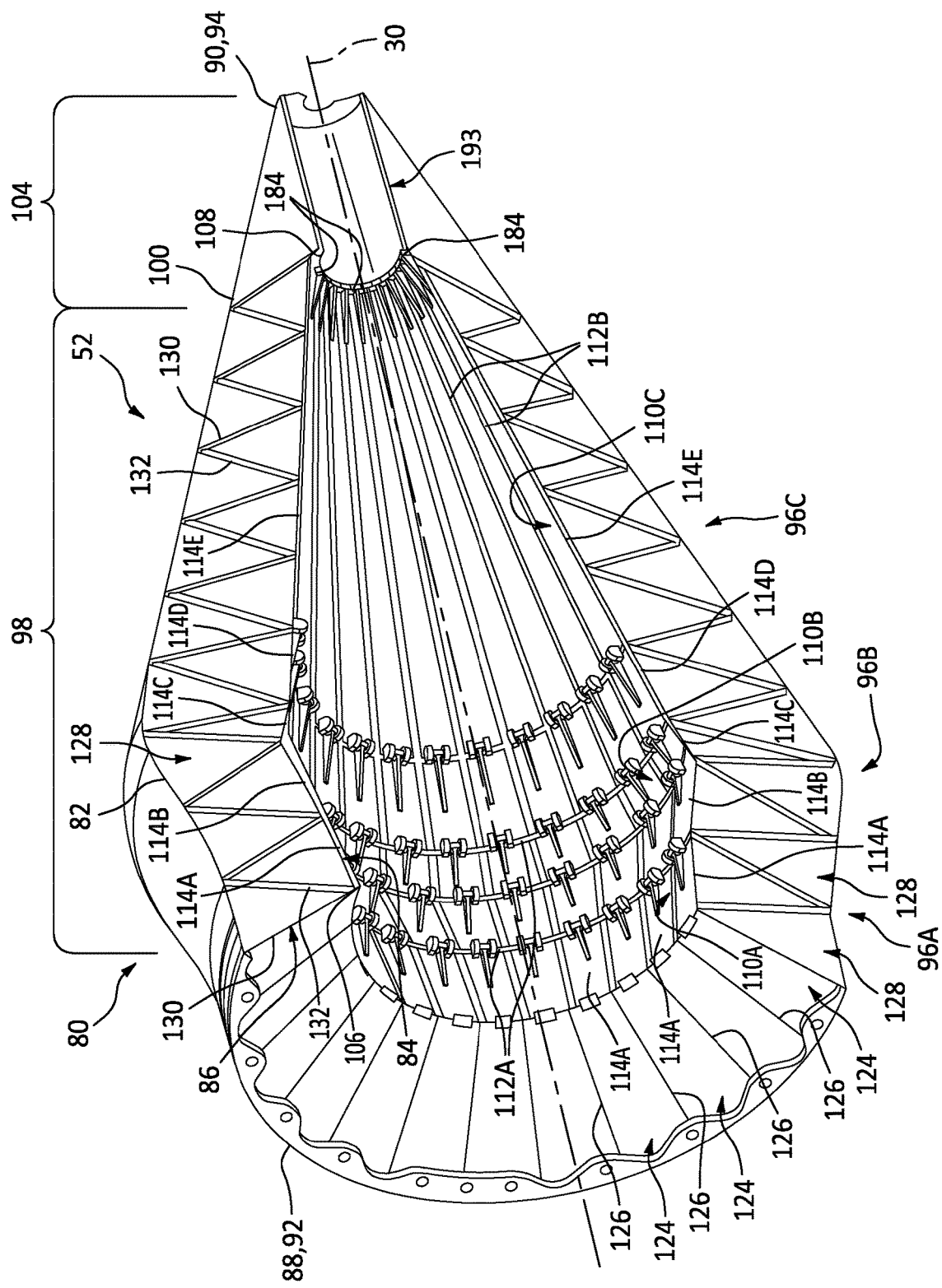
FIG. 3 is a perspective sectional illustration of an exhaust center body configured with an acoustic structure.

FIG. 3 illustrates the exhaust center body 52 with an acoustic structure 80 configured to attenuate relatively low frequency noise while accommodating the relatively severe operating conditions at the core nozzle outlet 55 (see FIG. 1). This acoustic structure 80 includes a perforated first skin 82, a solid (e.g., non-perforated) second skin 84 and a cellular core 86.

The first skin 82 is configured as a face and/or exterior skin of the acoustic structure 80. The first skin 82 of FIG. 3, in particular, forms a radial outermost skin of the acoustic structure 80 and the exhaust center body 52. The first skin 82 may be constructed from a relatively thin sheet of material such as metal. This first skin 82 extends circumferentially about (e.g., completely around) the centerline 30. The first skin 82 extends axially along the centerline 30 between and to a first (e.g., forward, upstream) end 88 of the first skin 82 and a second (e.g., aft, downstream) end 90 of the first skin 82.

The first skin 82 may have an undulating, tubular geometry. A radius from the centerline 30 to the first skin 82 of FIG. 3, for example, changes (e.g., increases and/or decreases) as the exhaust center body 52 extends from a first (e.g., forward, upstream) end 92 of the exhaust center body 52 to a second (e.g., aft, downstream) end 94 of the exhaust center body 52. This first skin radius may be tailored to provide the first skin 82 with one or more differently shaped sections 96A-C. The first (e.g., forward, upstream) end section 96A is configured with a concave sectional geometry when viewed, for example, in a plane parallel with and coincident with the centerline 30. The intermediate section 96B is configured with a convex sectional geometry when viewed, for example, in the plane parallel with and coincident with the centerline 30. The second (e.g., aft, downstream) end section 96C is configured with a tapered linear (or non-linear) sectional geometry when viewed, for example, in the plane parallel with and coincident with the centerline 30.

Figure 4:
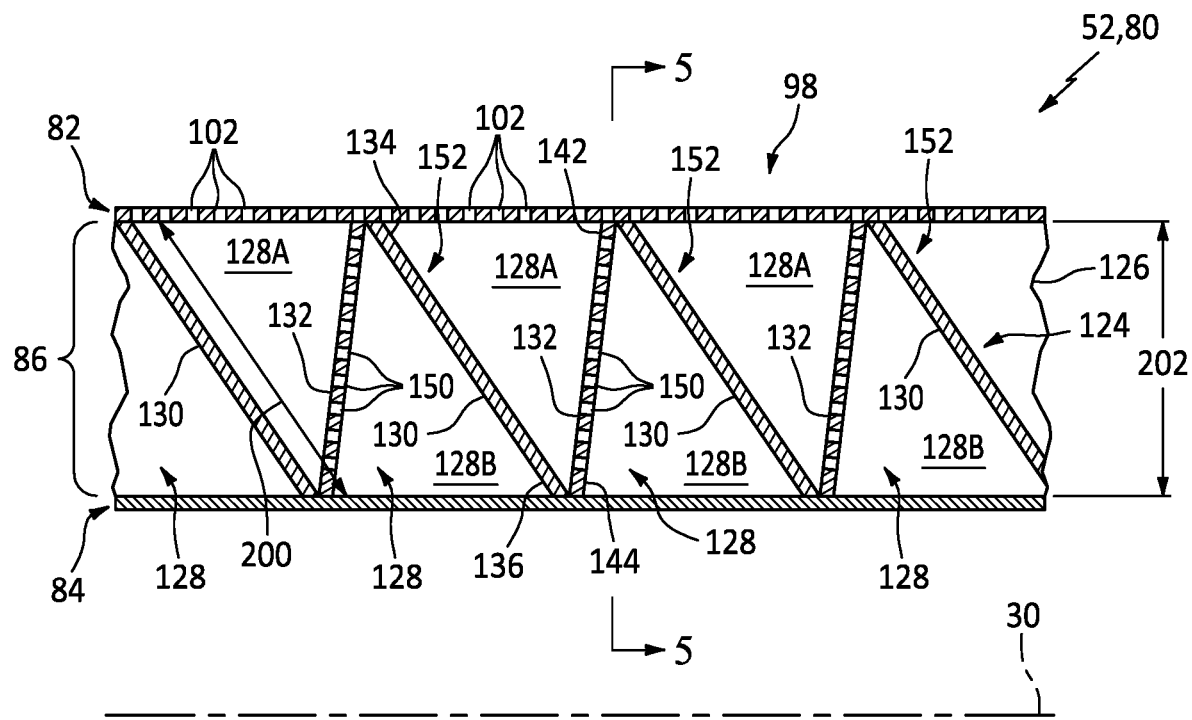
FIG. 4 is a schematic side sectional illustration of a portion of the acoustic structure.
Figure 5:
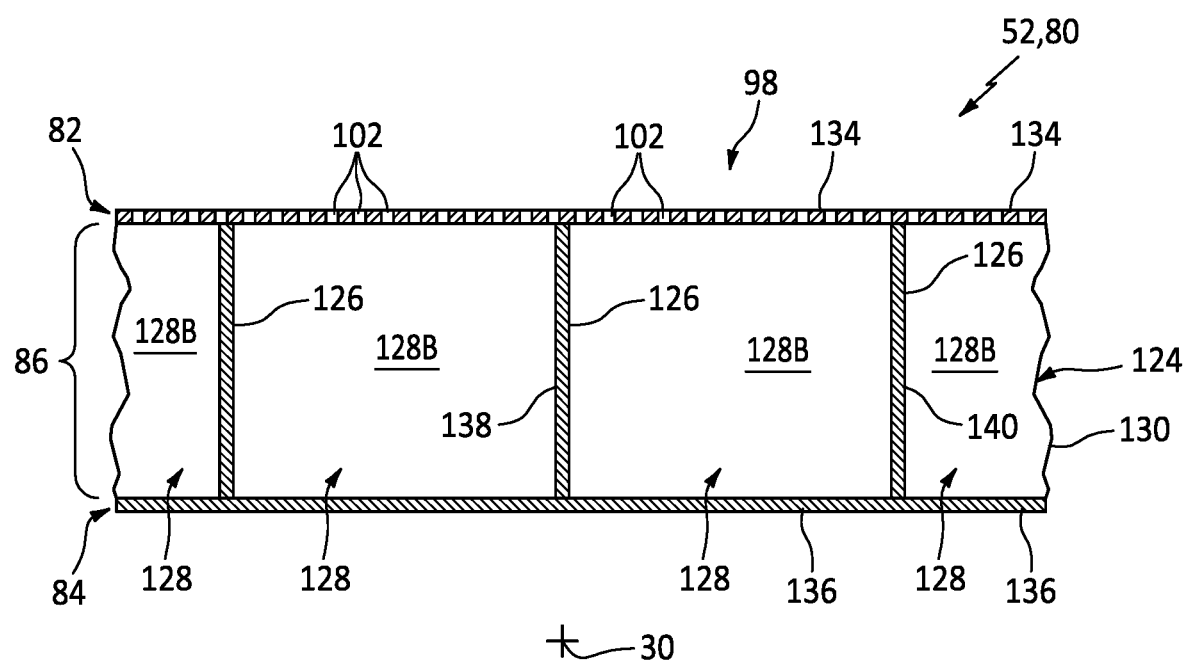
FIG. 5 is a schematic cross-sectional illustration of a portion of the acoustic panel taken along line 5-5 in FIG. 4.

At least a longitudinal region 98 (or an entirety) of the first skin 82 is perforated. The first skin perforated region 98 of FIG. 3, for example, extends longitudinally (e.g., generally axially) along the first skin 82 from (or about) the first skin first end 88 to an intermediate location 100 positioned longitudinally and intermediately along the second end section 96C. Referring to FIGS. 4 and 5, the first skin perforated region 98 includes a plurality of perforations 102 (e.g., apertures such as through-holes) in the first skin 82. Each of these first skin perforations 102 extends vertically (e.g., generally radially) through the first skin 82 in the perforated region between opposing inner and outer sides of the first skin 82.

The first skin 82 of FIG. 3 also includes a solid (e.g., non-perforated) region 104. This first skin solid region 104 extends longitudinally along the first skin 82 from the intermediate location 100 to the first skin second end 90. A longitudinal length of the first skin solid region 104 is less than a longitudinal length of the first skin perforated region 98. The solid region longitudinal length of FIG. 3, for example, is between one-third (⅓) and one-sixth (⅙) of the perforated region longitudinal length. The present disclosure, however, is not limited to such a dimensional relationship.

The second skin 84 is configured as a back and/or an interior skin of the acoustic structure 80. The second skin 84 of FIG. 3, in particular, forms a radial inner (e.g., innermost) skin of the acoustic structure 80 and the exhaust center body 52. This second skin 84 extends circumferentially about (e.g., completely around) the centerline 30. The second skin 84 extends axially along the centerline 30 between and to a first (e.g., forward, upstream) end 106 of the second skin 84 and a second (e.g., aft, downstream) end 108 of the second skin 84.

The second skin 84 may be configured with an undulating, tubular geometry. A radius from the centerline 30 to the second skin 84 of FIG. 3, for example, changes (e.g., increases and/or decreases) as the exhaust center body 52 extends from the center body first end 92 towards the center body second end 94, and to the second skin second end 108. This second skin radius may be tailored to provide the second skin 84 with one or more differently shaped sections 110A-C. The first (e.g., forward, upstream) end section 110A is configured with a convex sectional geometry when viewed, for example, in a plane parallel with and coincident with the centerline 30. The intermediate section 110B is configured with a concave sectional geometry when viewed, for example, in the plane parallel with and coincident with the centerline 30. The second (e.g., aft, downstream) end section 110C is configured with a tapered linear (or non-linear) sectional geometry when viewed, for example, in the plane parallel with and coincident with the centerline 30.

The second skin 84 is configured to provide the acoustic structure 80 with a solid (non-perforated) interior side. The second skin 84 may therefore be configured without any perforations, such as the perforations 102 in the first skin 82 (see FIGS. 4 and 5). The second skin 84, however, may be configured with one or more inter-panel longitudinal interfaces 112A (e.g., seems) and/or one or more inter-panel lateral (e.g., generally circumferential) interfaces 112B (e.g., seems) as described below in further detail.

The second skin 84 of FIG. 3 is configured with one or more sets of second skin panels 114A-E (generally referred to as "114"). The second skin panels 114 in each set (e.g., A-E) are arranged circumferentially about the centerline 30 in an (e.g., circular) array so as to form a respective tubular section of the second skin 84.

Figure 6:
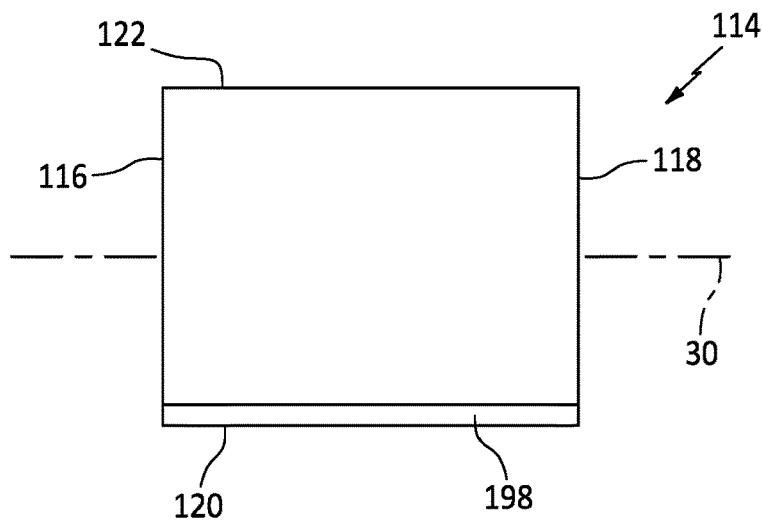
FIG. 6 is a plan view illustration of an interior skin panel.

Referring to FIG. 6, each of the second skin panels 114 may be constructed from a relatively thin sheet of material such as metal. Each of the second skin panels 114 extends longitudinally between and to a first (e.g., forward, upstream) end 116 of the respective second skin panel 114 and a second (e.g., aft, downstream) end 118 of the respective second skin panel 114. Each of the second skin panels 114 extends laterally between and to a first side 120 of the respective second skin panel 114 and a second side 122 of the respective second skin panel 114.

Figure 7:
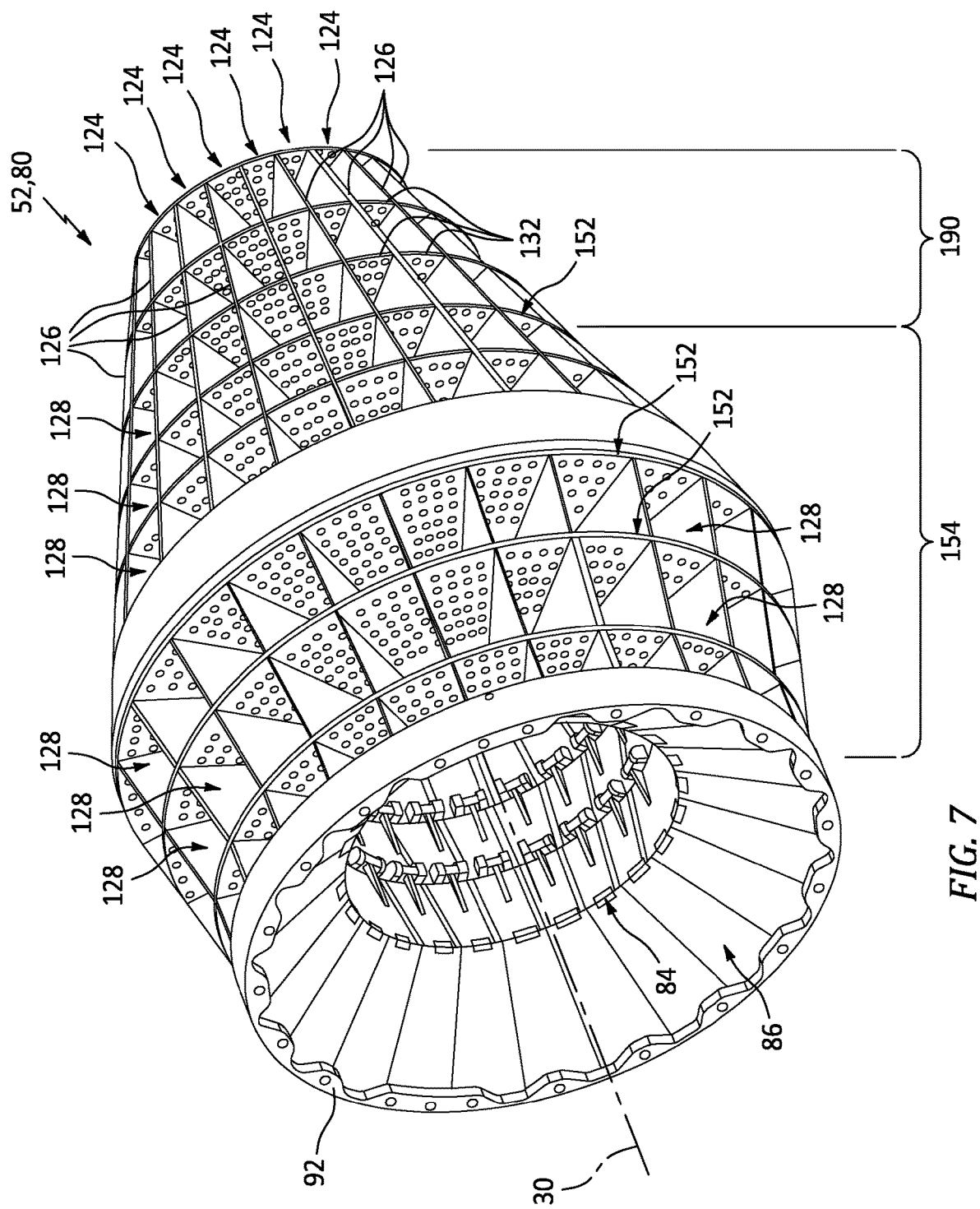
FIG. 7 is perspective illustration of a cellular core and an interior skin of the acoustic structure.

The cellular core 86 of FIG. 3 is arranged vertically between and connected to the first skin 82 and the second skin 84. The cellular core 86 includes a plurality of corrugated structures 124 and a plurality of (e.g., planar) sidewalls 126; e.g., cavity/chamber sidewalls. These cellular core components (e.g., 124 and 126) are arranged together to form a plurality of internal cavities 128 (e.g., sound attenuating, resonance chambers) vertically between the first skin 82 and the second skin 84; see also FIGS. 4 and 5. Referring to FIG. 7, the internal cavities 128 are arranged in one or more longitudinally extending rows (e.g., cavity arrays), where each row of the internal cavities 128 extends longitudinally within the cellular core 86. Each row of the internal cavities 128 includes one or more of the internal cavities 128. Referring to FIGS. 4 and 5, each of the internal cavities 128 is fluidly coupled with one or more of the first skin perforations 102.

Referring to FIGS. 5 and 7, each of the sidewalls 126 may be constructed from a relatively thin sheet of material such as metal. The sidewalls 126 may be arranged generally parallel with one another. Each of the sidewall 126 of FIG. 7, for example, is disposed in a respective plane that is parallel with and coincident with the centerline 30. The sidewalls 126 of FIGS. 5 and 7 are laterally spaced from one another such that the internal cavities 128 in each row extend laterally between and to a respective laterally adjacent pair of the sidewalls 126. Each of the internal cavities 128 is thereby formed by and disposed between the respective laterally adjacent pair of the sidewalls 126. Each of the sidewalls 126 also separates (e.g., fluidly isolates) respective laterally adjacent internal cavities 128 from one another.

Referring to FIG. 5, each of the sidewalls 126 extends vertically between and to the first skin 82 and the second skin 84. Each of the sidewalls 126 is orientated substantially perpendicular to the first skin 82 and the second skin 84. However, in other embodiments, one or more of the sidewalls 126 may be angularly offset from the first skin 82 and/or the second skin 84 by a non-ninety degree angle; e.g., an acute included angle.

Referring to FIGS. 4 and 7, each corrugated structure 124 includes one or more baffles 130 (not visible in FIG. 7) and one or more septums 132. These corrugated structure components 130 and 132 are arranged together and are interconnected (e.g., in a zig-zag pattern) to provide a longitudinally extending corrugated body. For example, the baffles 130 are interspersed with the septums 132. Each baffle 130 (unless configured at a longitudinal end of the sidewall 126) is disposed and may extend longitudinally between and to a respective longitudinally adjacent pair of the septums 132. Similarly, each septum 132 is disposed and may extend longitudinally between and to a respective longitudinally adjacent pair of the baffles 130.

Figure 8:
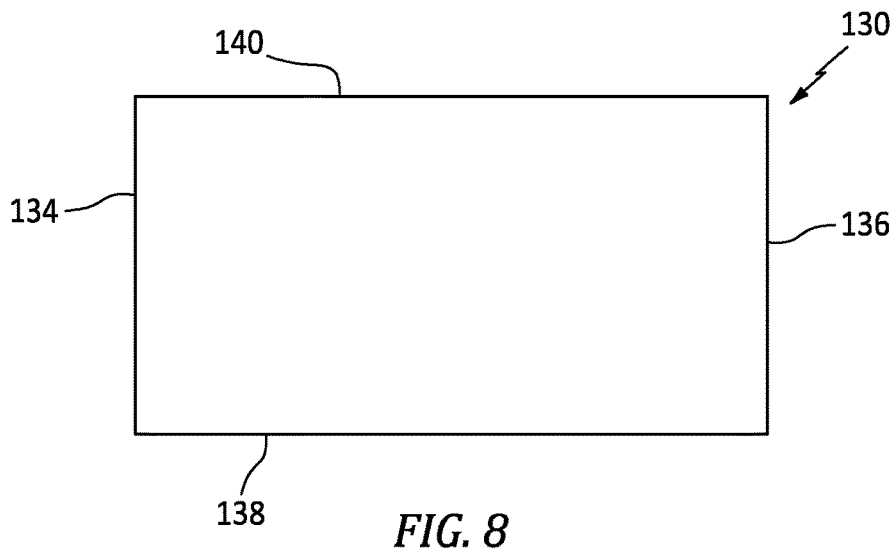
FIG. 8 is a plan view illustration of a baffle.

Referring to FIG. 8, each of the baffles 130 is configured as a solid (e.g., non-perforated) panel, which may be constructed from a relatively thin sheet of material such as metal. Each baffle 130 extends between and to a first (e.g., outer) end 134 of the baffle 130 and a second (e.g., inner) end 136 of the baffle 130. Each baffle 130 extends laterally between and to a first side 138 of the baffle 130 and a second side 140 of the baffle 130.

Figure 9:
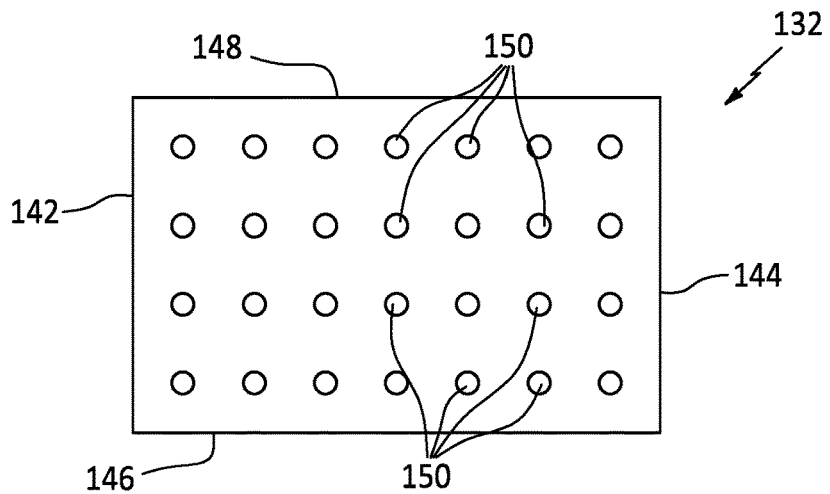
FIG. 9 is a plan view illustration of a septum.

Referring to FIG. 9, each of the septums 132 is configured as a perforated panel, which may be constructed from a relatively thin sheet of material such as metal. Each septum 132 extends between and to a first (e.g., outer) end 142 of the septum 132 and a second (e.g., inner) end 144 of the septum 132. Each septum 132 extends laterally between and to a first side 146 of the septum 132 and a second side 148 of the septum 132. Each septum 132 includes one or more perforations 150; e.g., apertures such as through-holes. Each of these septum perforations 150 extends through the respective septum 132 between opposing sides of that septum 132.

Each corrugated body of FIG. 7 includes one or more corrugations 152. Each of these corrugations 152 includes a longitudinally adjacent pair of the components 130 and 132 as best seen in FIG. 4.

Figure 10:
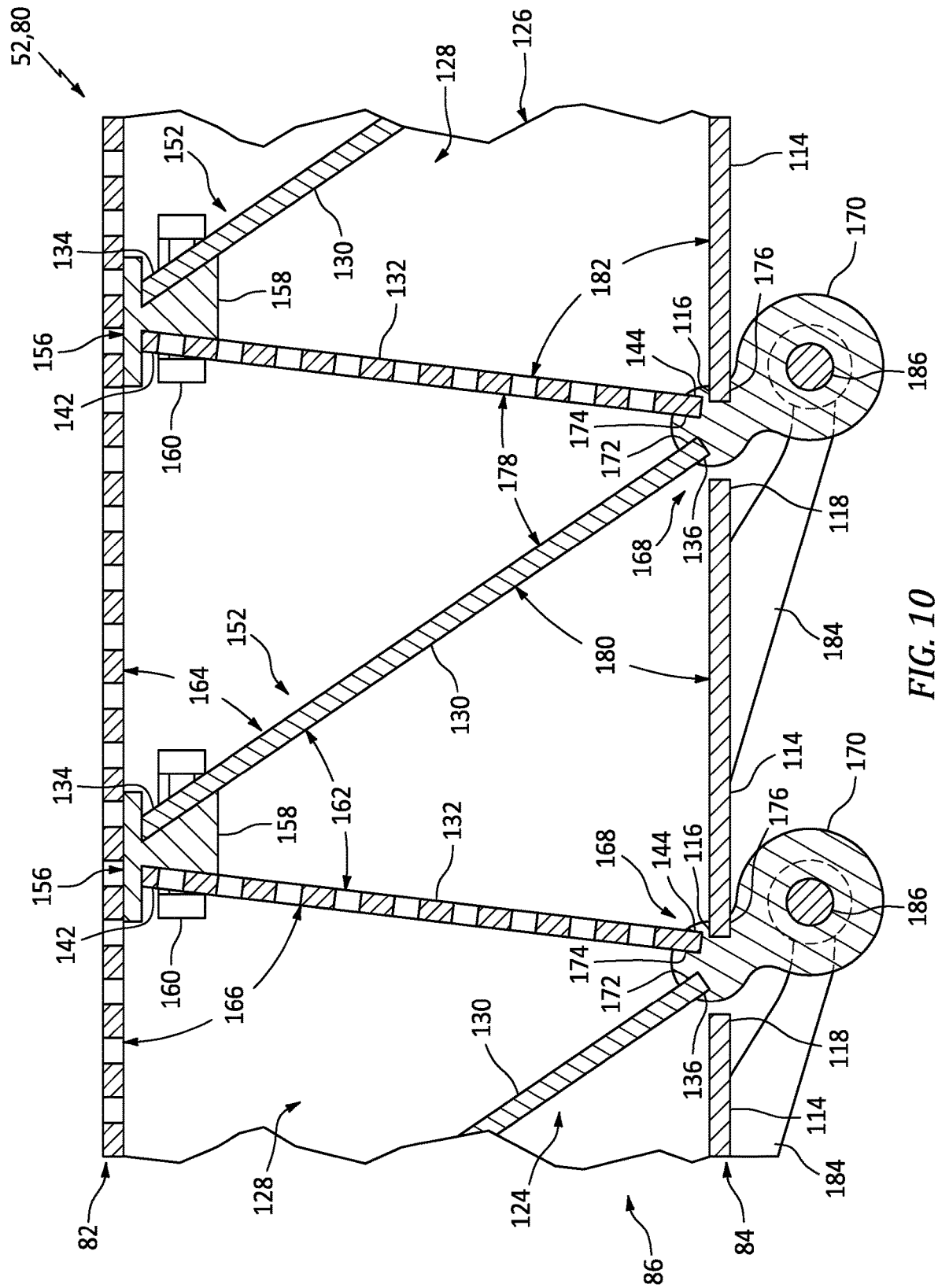
FIG. 10 is a side sectional illustration of a portion of the acoustic structure with fittings joining select acoustic panel components together.
Figure 11:
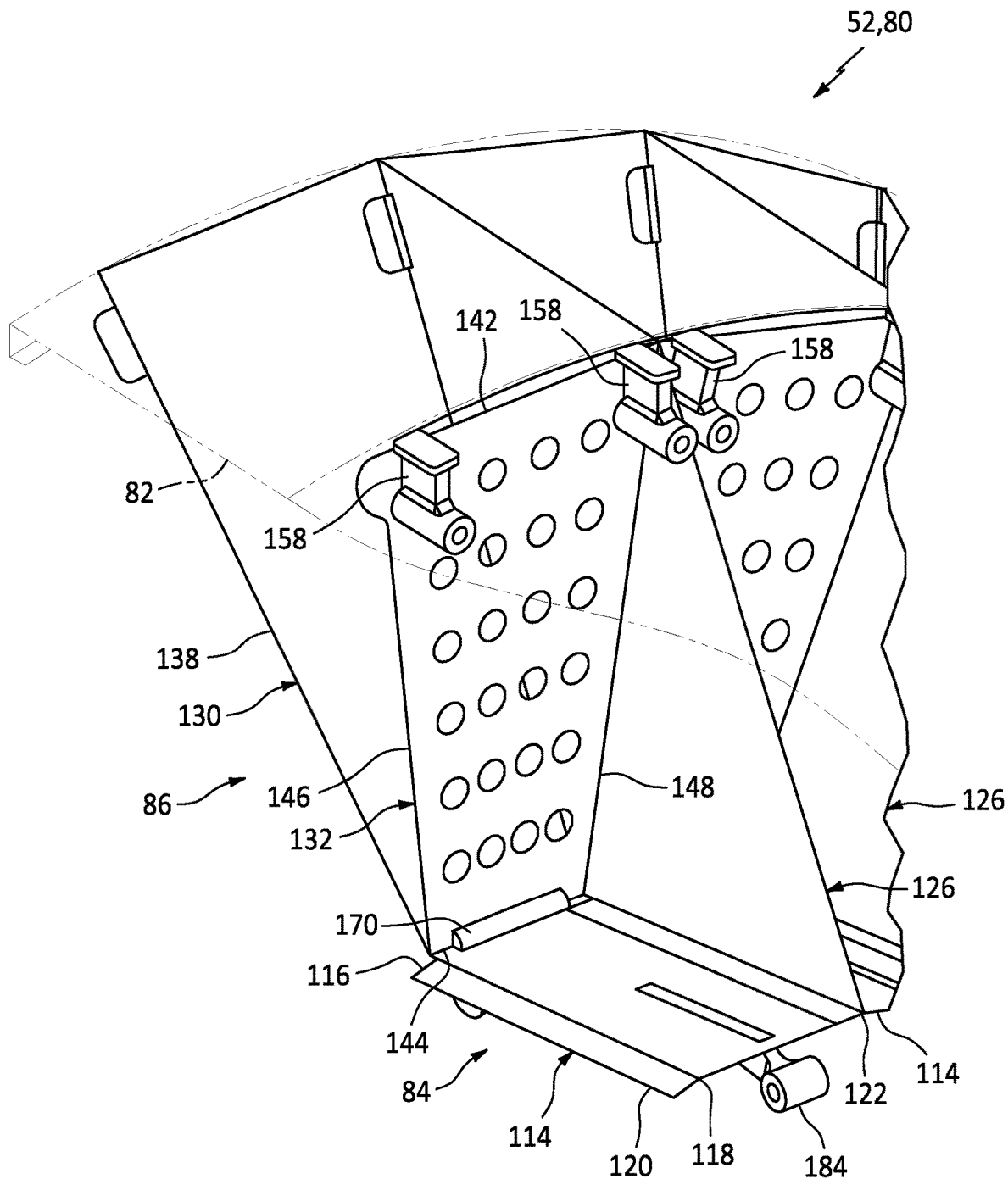
FIGS. 11 and 12 are perspective illustrations of forward portions of the acoustic structure.

Some or all of the corrugations 152 in a longitudinal first (e.g., forward, upstream) portion 154 of the cellular core 86 may have a common (or substantially similar) configuration. Referring to FIG. 10, within each of these corrugations 152, each baffle 130 is connected to and/or may meet a respective septum 132 at a peak 156 vertically adjacent the first skin 82. The baffle 130 of FIG. 10, for example, is fixedly connected to the septum 132 at (e.g., on, adjacent or proximate) the baffle first end 134 and the septum first end 142 by one or more (e.g., laterally spaced) first skin fittings 158; see also FIG. 11. Each first skin fitting 158 of FIG. 10, for example, is disposed longitudinally between the baffle first end 134 and the septum first end 142. The baffle 130 and the septum 132 are mechanically attached to each first skin fitting 158 by at least one fastener 160. The baffle 130 and/or the septum 132, of course, may also or alternatively be fixedly secured to the first skin fittings 158 by (e.g., spot) welding or otherwise bonding.

Each of the first skin fittings 158 is fixedly connected to the first skin 82. Each first skin fitting 158 of FIG. 10, for example, is (e.g., spot) welded or otherwise bonding to the first skin 82 at the first skin inner side. The first skin fitting 158 may thereby fixedly secure the baffle 130 and the septum 132 to the first skin 82. The present disclosure, however, is not limited to the foregoing exemplary arrangement. For example, in other embodiments, the components 130 and/or 132 may be connected (e.g., mechanically fastened and/or bonded) together without an intermediate member; e.g., the first skin fittings 158.

At the first skin peak 156, the baffle 130 is angularly offset from the septum 132 by an included angle 162; e.g., an acute angle. The included angle 162 of FIG. 10 is between thirty degrees (30°) and sixty degrees (60°). At the first skin peak 156, the baffle 130 is angularly offset from the first skin 82 by an included angle 164; e.g., an acute angle. The included angle 164 of FIG. 10 is between thirty degrees (30°) and sixty degrees (60°). In addition, at the first skin peak 156, the septum 132 is angularly offset from the first skin 82 by an included angle 166; e.g., a right angle, an acute angle or an obtuse angle. The included angle 166 of FIG. 10 is between seventy-five degrees (75°) and one-hundred and five degrees (105°). The present disclosure, however, is not limited to the foregoing exemplary angles.

Figure 12:
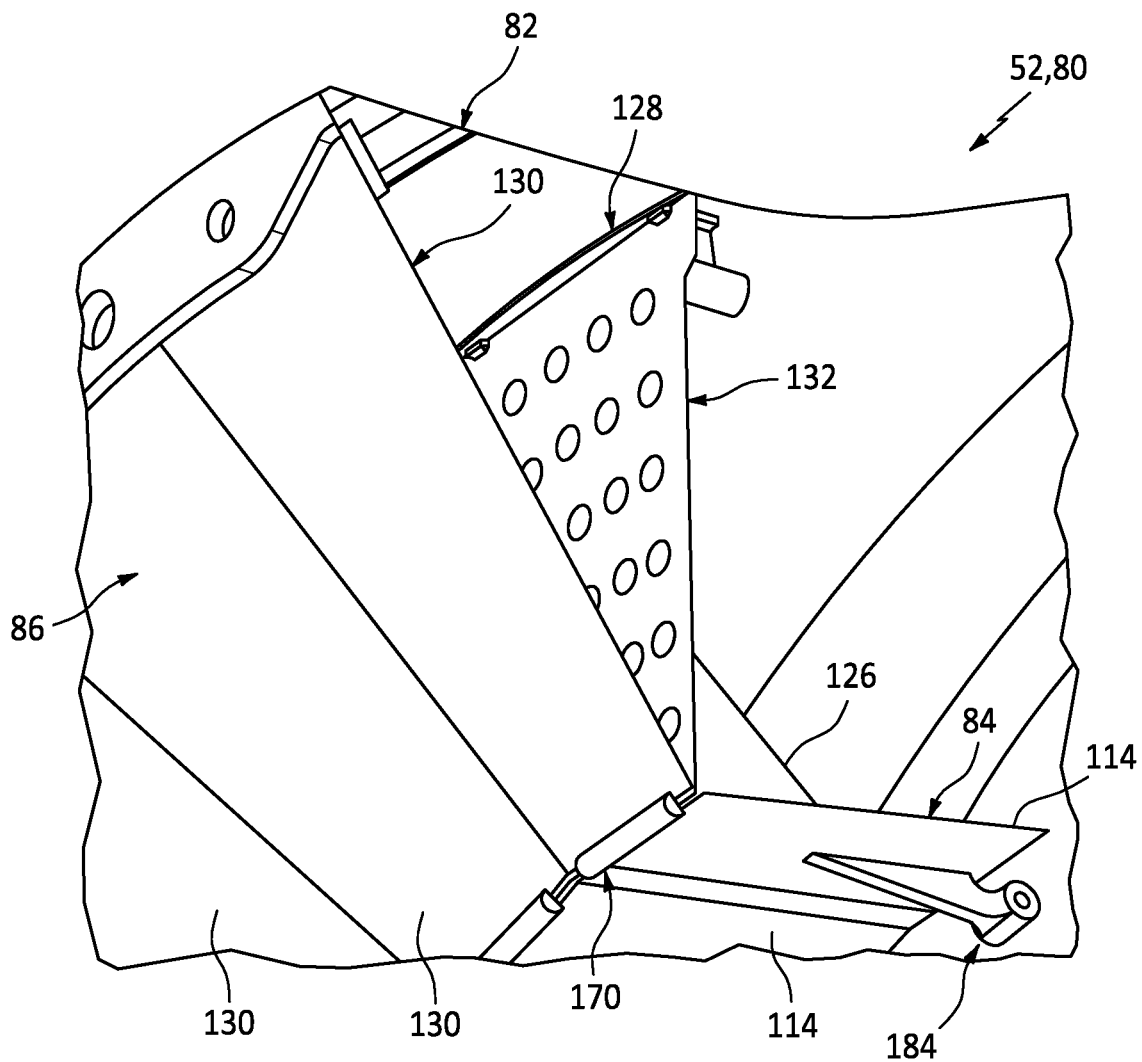

Each baffle 130 is connected to and may meet the septum 132 in a respective longitudinally adjacent corrugation 152 (referred to below as "neighboring septum" for ease of description) at a peak 168 vertically adjacent the second skin 84. The baffle 130 of FIG. 10, for example, is moveably connected to the neighboring septum 132 at (e.g., on, adjacent or proximate) the baffle second end 136 and the septum second end 144 by at least one second skin fitting 170; see also FIGS. 11 and 12. The second skin fitting 170, for example, is disposed longitudinally between the baffle second end 136 and the septum second end 144. The baffle 130 is moveably attached to the second skin fitting 170 by a moveable joint; e.g., a slip joint such as a sliding/translating joint. The baffle 130 of FIG. 10, for example, projects along a baffle axis partially into a baffle channel 172 (e.g., a slot, a groove, etc.) in the second skin fitting 170 to its baffle second end 136. The baffle 130 and the second skin fitting 170 are configured such that the baffle 130 may translate along the baffle axis within the baffle channel 172. Similarly, the neighboring septum 132 is moveably attached to the second skin fitting 170 by a moveable joint; e.g., a slip joint such as a sliding/translating joint. The neighboring septum 132 of FIG. 10, for example, projects along a septum axis partially into a septum channel 174 (e.g., a slot, a groove, etc.) in the second skin fitting 170 to its septum second end 144. The neighboring septum 132 and the second skin fitting 170 are configured such that the neighboring septum 132 may translate along the septum axis within the septum channel 174. The baffle 130 is thereby moveably connected to the neighboring septum 132 through the second skin fitting 170.

The second skin fitting 170 is connected to the second skin 84. The second skin fitting 170 of FIG. 10, for example, is moveably connected to a respective one of the second skin panels 114 by a moveable joint; e.g., a slip joint such as a sliding/translating joint. The respective second skin panel 114, for example, projects along a panel axis partially into a panel channel 176 to its panel first end 116. The respective second skin panel 114 and the second skin fitting 170 are configured such that the respective second skin panel 114 may translate along the panel axis within the panel channel 176. The second skin fitting 170 may thereby moveably connect the baffle 130 and the neighboring septum 132 to the second skin 84 and its respective second skin panel 114. The present disclosure, however, is not limited to the foregoing exemplary arrangement.

At the second skin peak 168, the baffle 130 is angularly offset from the neighboring septum 132 by an included angle 178; e.g., an acute angle. The included angle 178 of FIG. 10 is between thirty degrees (30°) and sixty degrees (60°). At the second skin peak 168, the baffle 130 is angularly offset from the second skin 84 by an included angle 180; e.g., an acute angle. The included angle 180 of FIG. 10 is between thirty degrees (30°) and sixty degrees (60°). In addition, at the second skin peak 168, the neighboring septum 132 is angularly offset from the second skin 84 by an included angle 182; e.g., a right angle, an acute angle or an obtuse angle. The included angle 182 of FIG. 10 is between seventy-five degrees (75°) and one-hundred and five degrees (105°). The present disclosure, however, is not limited to the foregoing exemplary angles.

Figure 13:
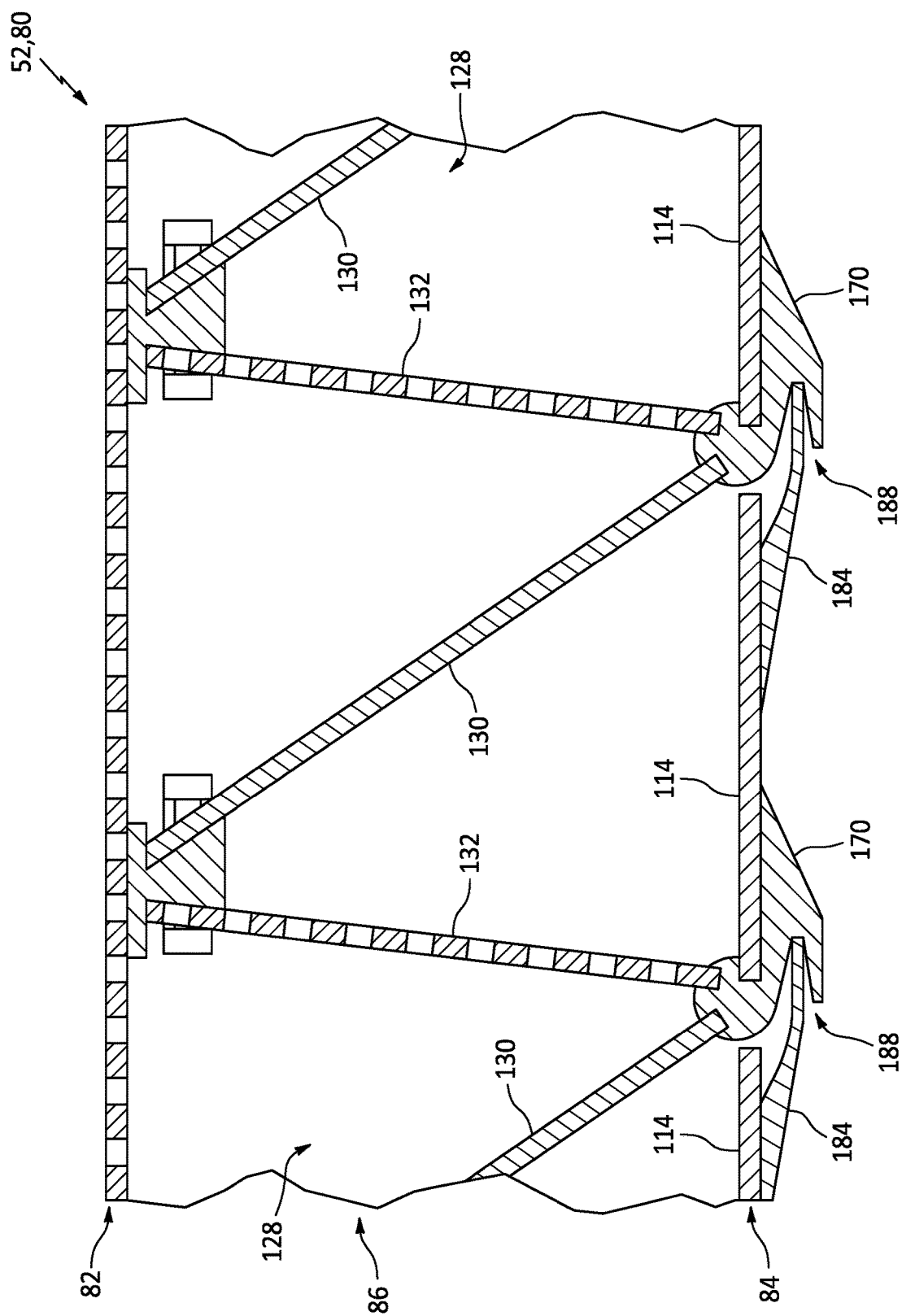
FIG. 13 is a side sectional illustration of a portion of the acoustic structure with alternative fittings interconnecting the interior skin panels.

Each second skin panel 114 may also be moveably connected to a longitudinally adjacent one of the second skin panels 114 (referred to below as "neighboring second skin panel" for ease of description) by the second skin fitting 170. The second skin fitting 170 of FIG. 10, for example, is moveably connected to a complimentary inter-panel fitting 184. This inter-panel fitting 184 is fixedly connected to the neighboring second skin panel 114. The inter-panel fitting 184, for example, is (e.g., spot) welded or otherwise bonded to the neighboring second skin panel 114 at the second skin inner side. The inter-panel fitting 184 of FIG. 10 is pivotally connected to the second skin fitting 170 by a pivot (e.g., hinge) joint; e.g., a pin connection 186. The present disclosure, however, is not limited to such an exemplary moveable connection. For example, referring to FIG. 13, the inter-panel fitting 184 may alternatively be connected to the second skin fitting 170 by a slip joint such as a sliding/translating joint 188 (e.g., a v-blade joint).

With the foregoing arrangement, each of the second skin panels 114 and, thus, the second skin 84 may be configured as a floating skin. For example, the second skin 84 and its panels 114 may float (e.g., shift/move) relative to one or more other components (e.g., 82, 86, 126, 130 and/or 132) of the acoustic structure 80. Each second skin panel 114 may also float (e.g., shift/move) relative to one or more of the other second skin panels 114. The acoustic structure 80 may thereby accommodate relatively large thermal differentials across the exhaust center body 52. More particularly, the floating arrangement of the second skin 84 as well as the floating arrangement between adjacent cellular core components (e.g., 126, 130 and/or 132) accommodate slight thermally induced shifts between the various acoustic structure components (e.g., 82, 84, 86, 114, 126, 130 and/or 132).

Figure 14:
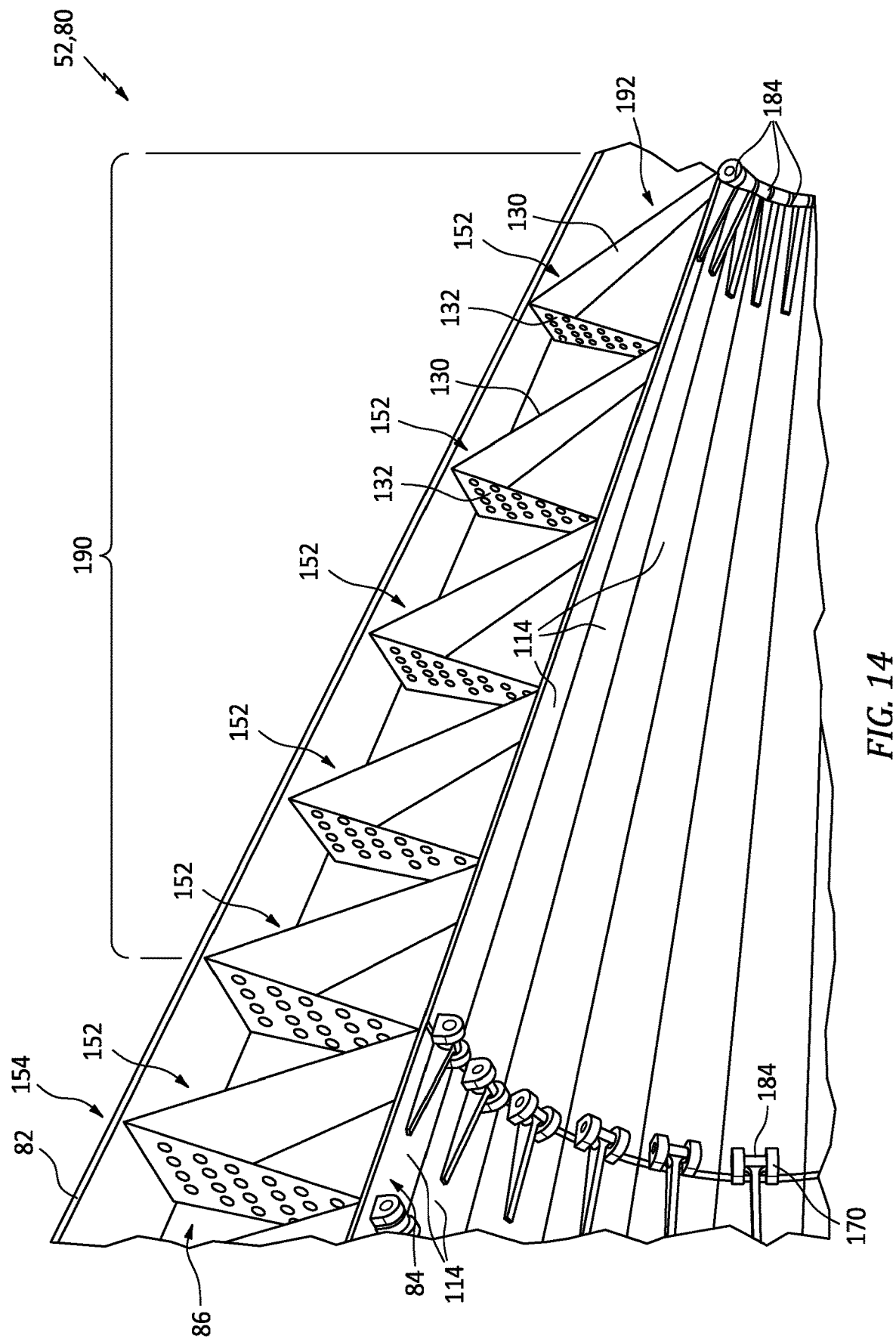
FIG. 14 is a perspective illustration of an aft portion of the acoustic structure.

Referring to FIG. 14, the corrugations 152 in a longitudinal second (e.g., aft, downstream) portion 190 of the cellular core 86 may be configured similar to the corrugations 152 in the longitudinal first portion 154 of the cellular core 86 (see also FIG. 7). However, whereas each of the baffles 130 is formed discrete from each of the septums 132 in the longitudinal first portion 154 of the cellular core 86, one or more of the baffles 130 and one or more of the septums 132 in the longitudinal second portion 190 of the cellular core 86 in a common row may be formed together in a unitary body; e.g., a corrugated ribbon 192 of material. The end panel (e.g., baffle 130 or septum 132) of each corrugated ribbon 192 may be connected to the first skin 82 or the second skin 84 in a similar manner as described above with respect to the panels (e.g., baffle 130 and septum 132) in the longitudinal first portion 154 of the cellular core 86. The present disclosure, however, is not limited to such coupling techniques. Furthermore, while each corrugation 152 in the longitudinal first portion 154 of the cellular core 86 may be associated with (e.g., longitudinally and laterally overlapped by) a respective one of the second skin panels 114, each corrugated ribbon 192 (e.g., one or more baffles 130 and one or more septums 132) may be associated with (e.g., longitudinally and laterally overlapped by) a respective one of the second skin panels 114. The present disclosure, however, is not limited to such an exemplary arrangement.

Referring to FIG. 3, the acoustic structure 80 may be connected to an (e.g., tubular) inner support 193. This inner support 193 may be configured as or otherwise include, but is not limited to, a (e.g., unitary) cylindrical mount, strut and/or case. This inner support 193 is connected to the second skin 84 and/or the cellular core 86. The inner support 193 of FIG. 3, for example, is movably (e.g., pivotally) connected to the acoustic structure components 84 and 86 through the inter-panel fittings 184 at the second skin second end 108. Of course, various other moveable (or fixed) mounting techniques may also or alternatively be used to connect the components 84, 86 and 193 together. The inner support 193 of FIG. 3 projects axially out from the acoustic structure 80 along the centerline 30 to or about the center body second end 94, where the inner support 193 may be (e.g., directly or indirectly) connected to the first skin 82. The inner support 193 may thereby structurally support an axial end (e.g., an aft and/or downstream end) of the acoustic structure 80 and/or structurally tie the first and the second skins 82 and 84 together at the center body second end 94.

Figure 15:
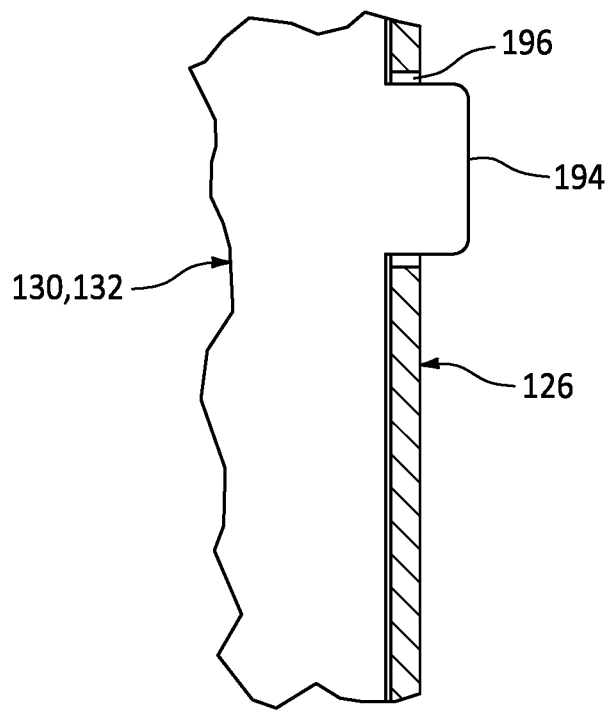
FIG. 15 is a sectional illustration of an interface between a corrugation component and a sidewall.

Referring to FIG. 15, each cellular core component 130, 132 may be (e.g., fixedly or moveably) connected to each sidewall 126. Each cellular core component 130, 132 of FIG. 15, for example, is connected to each sidewall 126 by a male-female interface. Each cellular core component 130, 132 of FIG. 15, in particular, includes a tab 194 that projects into and through a corresponding slot 196 in the sidewall 126. The cellular core component 130, 132 may also or alternatively be otherwise mechanically fastened and/or bonded to the sidewall 126 to fixedly secure those cellular core components together.

Figure 16:
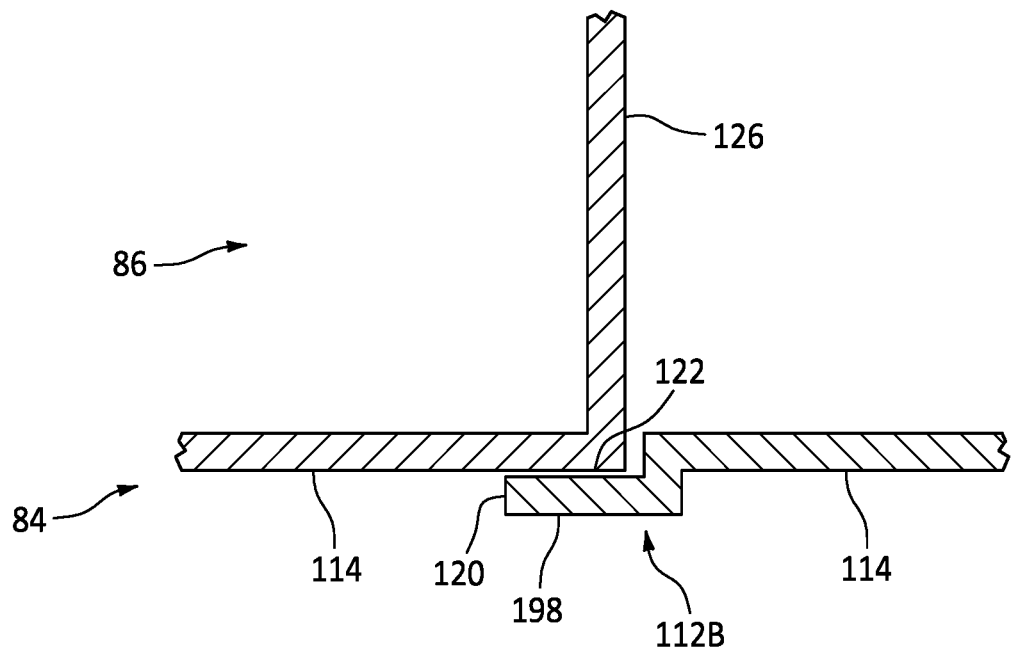
FIG. 16 is a sectional illustration of an interface between laterally adjacent interior skin panels.

Referring to FIG. 16, each second skin panel 114 may overlap a laterally adjacent one of the second skin panels 114 at the lateral interface 112B therebetween. Each second skin panel 114 of FIG. 16, for example, includes a flange 198 (e.g., a jog) that provides a lap joint between the respective laterally adjacent second skin panels 114.

With the foregoing configuration, referring to FIGS. 4 and 5, each internal cavity 128 extends vertically between and is formed by the first skin 82 and the second skin 84 and, more particularly, a respective one of the second skin panels 114. Referring to FIGS. 5 and 7, each internal cavity 128 extends laterally between and is formed by a laterally adjacent pair of the sidewalls 126. Referring to FIGS. 4 and 7, each internal cavity 128 extends longitudinally between and is formed by a longitudinally adjacent pair of the baffles 130. In addition, as best seen in FIG. 4, each internal cavity 128 may be divided by a respective septum 132 into a plurality (e.g., a pair) of fluidly coupled sub-cavities 128A and 128B, where the first skin sub-cavity 128A is fluidly coupled with the second skin sub-cavity 128B through the septum perforations 150.

Each of the cavities 128 forms a resonance chamber. A length 200 of the resonance chamber extends diagonally (e.g., longitudinally and vertically) between the first skin 82 and the second skin 84 and through a respective one of the septums 132. The length 200 of the resonance chamber therefore is longer than a vertical thickness 202 of the cellular core 86. This enables noise attenuation of relatively low frequency noise without increasing the vertical thickness 202 of the cellular core 86 and, thus, a vertical thickness of the acoustic structure 80. For example, each resonance chamber may receive noise waves through the first skin perforations 102. The resonance chamber may reverse the phase of one or more frequencies of those sound waves using known acoustic reflection principles and subsequently direct the reverse phase sound waves out of the acoustic structure 80 through the first skin perforations 102 to destructively interfere with other incoming noise waves.

Figure 17A:
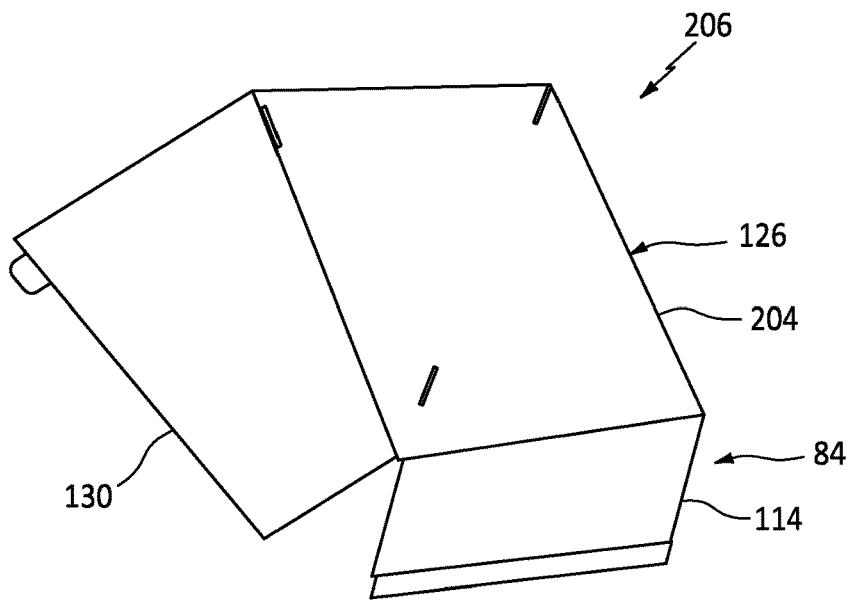
FIG. 17A is a perspective illustration of a module that includes an interior skin panel, a baffle and a sidewall section.
Figure 17B:
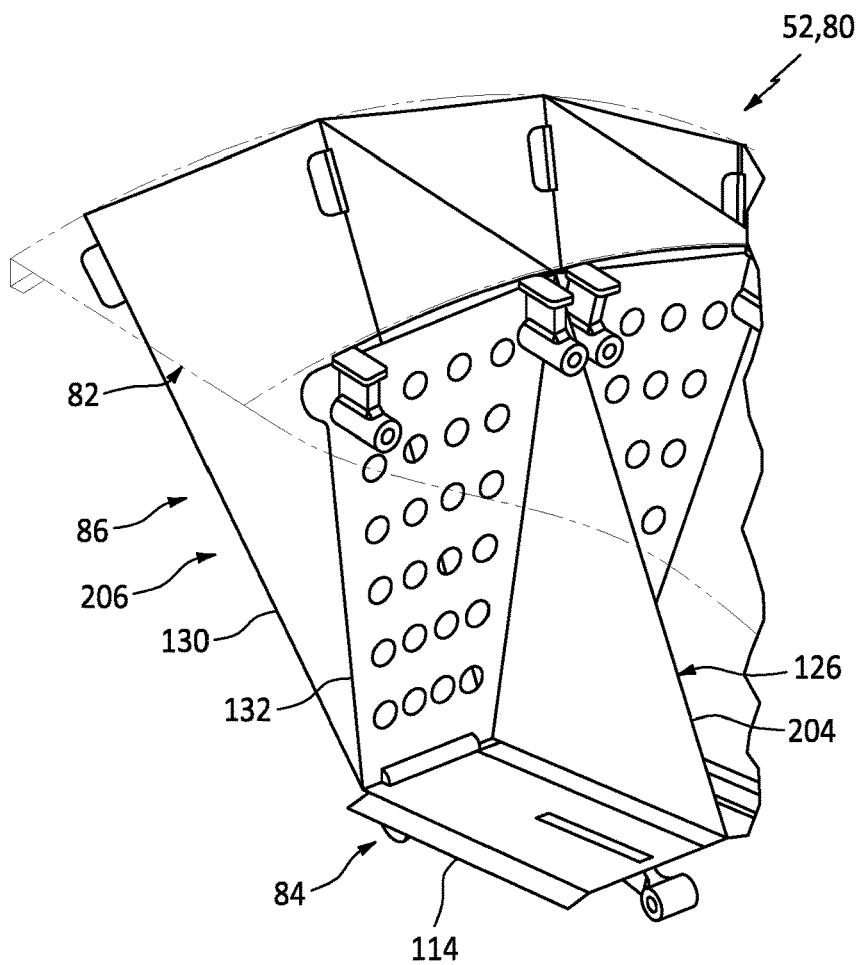
FIG. 17B is a perspective illustration of the module configured with a portion of the acoustic structure.

In some embodiments, referring to FIGS. 17A and 17B, one of the baffles 130, one of the second skin panels 114 and a section 204 of one of the sidewalls 126 may be configured in a module 206 from a single common sheet of material; e.g., sheet metal. A single sheet of material, for example, may be cut and then folded to form the acoustic structure components 114, 130 and 204. With such an arrangement, the acoustic structure 80 may be assembled by iteratively securing one of the modules 206 with one of the septums 132 (or one of the corrugated ribbons 192) to the first skin 82.

Figure 18:
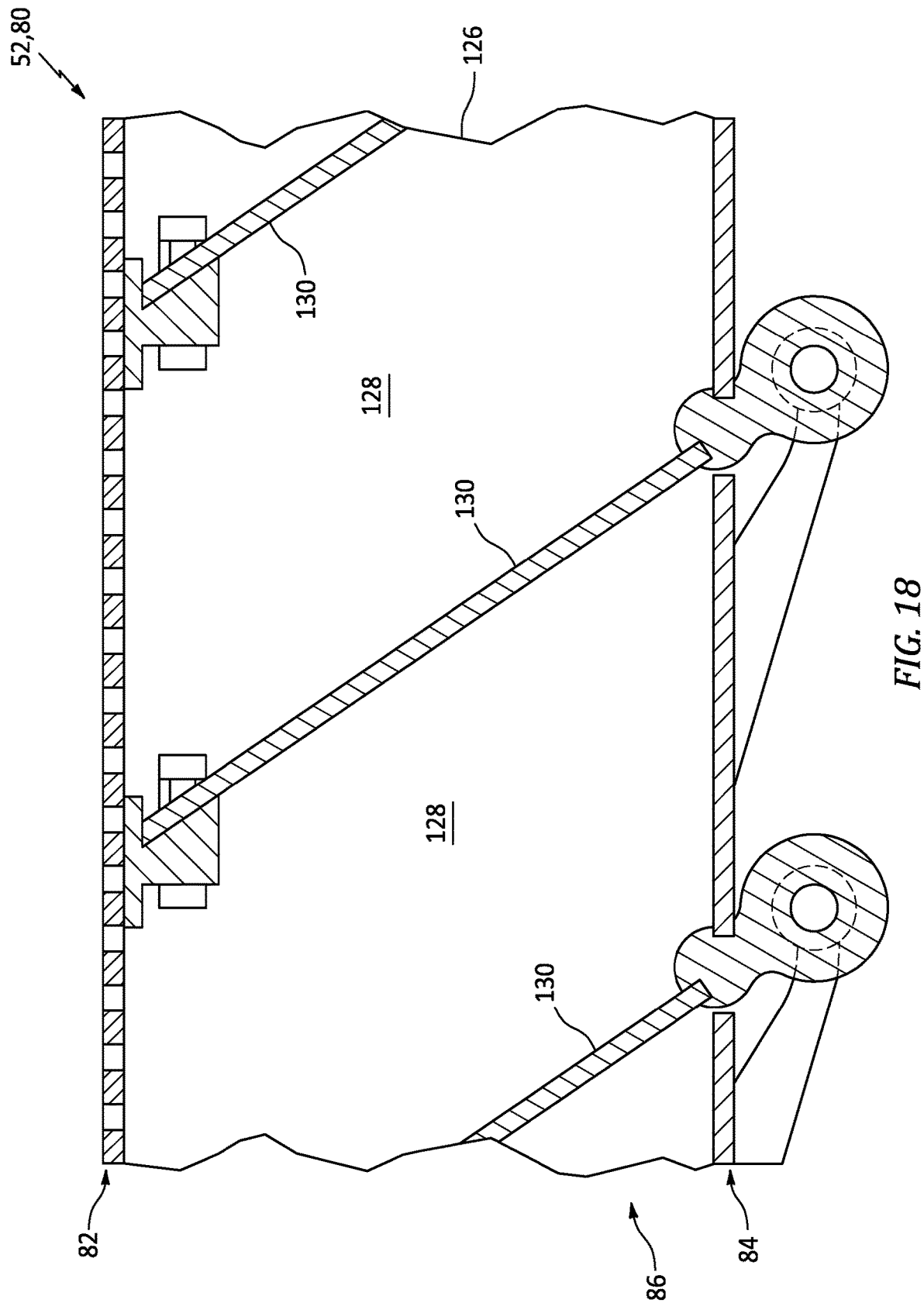
FIG. 18 is a side sectional illustration of a portion of the acoustic structure configured without septums.

In some embodiments, referring to FIG. 18, one or more of the internal cavities 128 may be configured without a septum therein.

Figure 19:
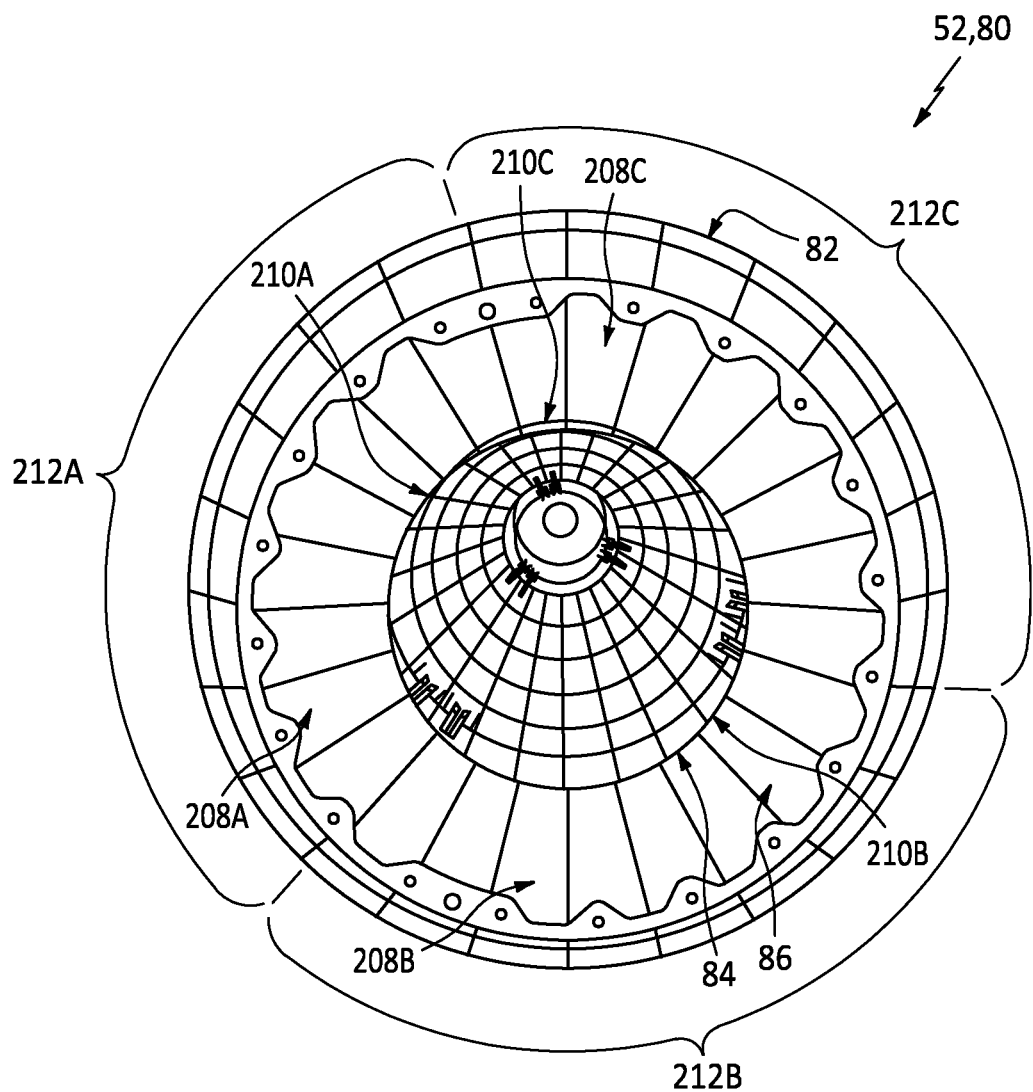
FIG. 19 is a perspective illustration of the exhaust center body configured from a plurality of arcuate modules.

In some embodiments, referring to FIG. 19, sections 208A-C of the cellular core 86 and associated sections 210A-C of the second skin 84 may be formed together as a module 212A-C (generally referred to as "212"). Each module 212 may then be attached to the first skin 82 in a similar manner as described above; e.g., via bonding.

In some embodiments, referring to FIG. 10 for example, one or more of the first skin fittings 158 and/or one or more of the second skin fittings 170 may be constructed from material that is complementary to the metal forming the components 82, 84 and/or 86 connected thereto. One or more of the fittings 158 and/or 170, for example, may be constructed from metal; e.g., the same metal as the components 82, 84 and/or 86 or a metal with a similar coefficient of thermal expansion. In other embodiments, one or more of the fittings 158 and/or 170 may be constructed from a ceramic material; e.g., pure ceramic or a ceramic matrix composite (CMC) material. The present disclosure, however, is not limited to the foregoing exemplary acoustic structure materials.

The acoustic structure 80 is described above as being incorporated into, part of or otherwise forming the exhaust center body 52. The acoustic structure 80 of the present disclosure, however, is not limited to such an exemplary application. For example, the acoustic structure 80 may alternatively be configured to provide sound attenuation in other areas of the aircraft propulsion system 20. Furthermore, the acoustic structure 80 of the present disclosure is not limited to aircraft propulsion system applications. The acoustic structure 80 of the present disclosure, for example, may alternatively be configured for attenuating noise associated with/generated by an auxiliary power unit (APU) or an industrial gas turbine engine. It is also contemplated the acoustic structure 80 of the present application may alternatively be configured to attenuate noise generated by sources other than a gas turbine engine.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A structure, comprising:
   a perforated first skin;
   a second skin; and
   a core comprising a first sidewall, a second sidewall, a first baffle and a second baffle, the core forming a plurality of cavities vertically between the perforated first skin and the second skin;
   the first baffle extending between a first baffle first end and a first baffle second end, the first baffle connected to the perforated first skin at the first baffle first end, and the first baffle connected to the second skin at the first baffle second end by a first moveable joint;
   the second baffle extending between a second baffle first end and a second baffle second end, the second baffle connected to the perforated first skin at the second baffle first end, and the second baffle connected to the second skin at the second baffle second end; and
   the plurality of cavities comprising a first cavity, the first cavity extending laterally between the first sidewall and the second sidewall, and the first cavity extending longitudinally between the first baffle and the second baffle;
   wherein the second skin comprises a first panel and a second panel that is connected to the first panel at a second moveable joint, the first baffle is connected to the first panel at a first end of the first panel by the first moveable joint, and the second baffle is connected to the second panel at a first end of the second panel.

2. The structure of claim 1, wherein the first moveable joint comprises a slip joint.

3. The structure of claim 1, further comprising:
   a bracket connected to the second skin and comprising a baffle channel;
   the first baffle projecting into the baffle channel to the first baffle second end, and the first baffle configured to translate within the baffle channel to form the first moveable joint.

4. A structure, comprising:
   a perforated first skin;
   a second skin;
   a core comprising a first sidewall, a second sidewall, a first baffle and a second baffle, the core forming a plurality of cavities vertically between the perforated first skin and the second skin;
   the first baffle extending between a first baffle first end and a first baffle second end, the first baffle connected to the perforated first skin at the first baffle first end, and the first baffle connected to the second skin at the first baffle second end by a first moveable joint;
   the second baffle extending between a second baffle first end and a second baffle second end, the second baffle connected to the perforated first skin at the second baffle first end, and the second baffle connected to the second skin at the second baffle second end; and
   the plurality of cavities comprising a first cavity, the first cavity extending laterally between the first sidewall and the second sidewall, and the first cavity extending longitudinally between the first baffle and the second baffle; and
   a bracket connected to the second skin and comprising a baffle channel, the first baffle projecting into the baffle channel to the first baffle second end, and the first baffle configured to translate within the baffle channel to form the first moveable joint;
   wherein the second skin comprises a first panel extending between a first panel first end and a first panel second end;
   wherein the bracket further comprises a panel channel, the first panel projects into the panel channel to the first panel first end, and the first panel is configured to translate within the panel channel; and
   wherein the first panel is connected to the second baffle and is next to the first panel second end.

5. A structure, comprising:
   a perforated first skin;
   a second skin;
   a core comprising a first sidewall, a second sidewall, a first baffle and a second baffle, the core forming a plurality of cavities vertically between the perforated first skin and the second skin;
   the first baffle extending between a first baffle first end and a first baffle second end, the first baffle connected to the perforated first skin at the first baffle first end, and the first baffle connected to the second skin at the first baffle second end by a first moveable joint;
   the second baffle extending between a second baffle first end and a second baffle second end, the second baffle connected to the perforated first skin at the second baffle first end, and the second baffle connected to the second skin at the second baffle second end; and
   the plurality of cavities comprising a first cavity, the first cavity extending laterally between the first sidewall and the second sidewall, and the first cavity extending longitudinally between the first baffle and the second baffle;
   a bracket connected to the second skin and comprising a baffle channel, the first baffle projecting into the baffle channel to the first baffle second end, and the first baffle configured to translate within the baffle channel to form the first moveable joint; and a first septum dividing the first cavity into a plurality of fluidly coupled sub-cavities;

the first septum extending between a first septum first end and a first septum second end;

the first septum connected to the perforated first skin at the first septum first end; and the bracket further comprising a septum channel, the first septum projecting into the septum channel to the first septum second end, and the first septum configured to translate within the septum channel.

6. The structure of claim 5, wherein the first septum is fixedly connected to the perforated first skin at the first septum first end.

7. The structure of claim 1, wherein the first baffle is fixedly connected to the perforated first skin at the first baffle first end.

8. The structure of claim 1, wherein the second baffle is connected to the second skin at the second baffle second end by a second moveable joint.

9. The structure of claim 8, wherein the second baffle is fixedly connected to the perforated first skin at the second baffle first end.

10. The structure of claim 1, further comprising:

a bracket connected to the second skin and comprising a baffle channel;

the second baffle projecting into the baffle channel to the second baffle second end, and the second baffle configured to translate within the baffle channel.

11. The structure of claim 1, further comprising:

a corrugated ribbon arranged laterally between the first sidewall and the second sidewall;

the corrugated ribbon comprising the second baffle.

12. The structure of claim 11, further comprising a first septum dividing the first cavity into a plurality of fluidly coupled sub-cavities.

13. The structure of claim 1, further comprising:

a first septum dividing the first cavity into a plurality of fluidly coupled sub-cavities; and the first septum extending between a first septum first end and a first septum second end, the first septum connected to the perforated first skin at the first septum first end, and the first septum connected to the second skin at the first septum second end.

14. The structure of claim 1, further comprising a plurality of modules arranged circumferentially around a longitudinal centerline in an array, a first of the modules including a section of the first sidewall, the first baffle and a section of the second skin.

15. The structure of claim 1, further comprising an exhaust center body for a gas turbine engine, the exhaust center body comprising the perforated first skin, the second skin and the core.

* * * * *